US012175854B2

(12) United States Patent
Wadhwani et al.

(10) Patent No.: US 12,175,854 B2
(45) Date of Patent: Dec. 24, 2024

(54) SYNCHRONIZING DATA BETWEEN FIRE PANELS AND THE MASS NOTIFICATION SYSTEM

(71) Applicant: Carrier Corporation, Palm Beach Gardens, FL (US)

(72) Inventors: Sangeeta Wadhwani, Telangana (IN); George Sridhar Bandhanadham, Telangana (IN); Naveen Kumar Maddoju, Telangana (IN); Romit Nurani, Telangana (IN); Ankita Mahendru, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 84 days.

(21) Appl. No.: 17/963,283

(22) Filed: Oct. 11, 2022

(65) Prior Publication Data

US 2023/0114126 A1 Apr. 13, 2023

Related U.S. Application Data

(60) Provisional application No. 63/254,627, filed on Oct. 12, 2021.

(51) Int. Cl.

| | |
|---|---|
| ***G08B 27/00*** | (2006.01) |
| ***G08B 17/00*** | (2006.01) |
| ***G08B 25/14*** | (2006.01) |

(52) U.S. Cl.

CPC ........... *G08B 27/005* (2013.01); *G08B 17/00* (2013.01); *G08B 25/14* (2013.01)

(58) Field of Classification Search

CPC .... G08B 17/00; G08B 25/007; G08B 27/005; G08B 5/22; G08B 25/14; G08B 27/00; G08B 25/009; H04W 4/90

See application file for complete search history.

(56) References Cited

U.S. PATENT DOCUMENTS 7,079,831 B2 7/2006 Schwartzman et al.
8,013,755 B2 * 9/2011 Rock ...................... G08B 27/00 340/815.45
8,429,254 B2 4/2013 Khan
8,943,146 B2 * 1/2015 Lefrancois des Courtis ............... H04L 12/1859 709/206

(Continued)

FOREIGN PATENT DOCUMENTS

WO 2018088912 A2 5/2018

OTHER PUBLICATIONS

Author Unknown, "Simple Solution to Mass Notification", 2020, National Fire Protection, 1 Page.

(Continued)

*Primary Examiner* — John A Tweel, Jr.

(74) *Attorney, Agent, or Firm* — CANTOR COLBURN LLP

(57) ABSTRACT

A computer-implemented method and system for synchronizing a mass notification. A method includes detecting an update in a configuration at a control panel over a first communication channel, and generating an update notification message based at least in part on the detection. The method can also include transmitting the update notification message over a second communication channel to synchronize an MNS with the update in the configuration at the control panel.

18 Claims, 3 Drawing Sheets

100

(56) References Cited

U.S. PATENT DOCUMENTS

| | | | |
|---|---|---|---|
| 9,083,443 | B2 | 7/2015 | Becker et al. |
| 9,142,103 | B2 | 9/2015 | Robotham et al. |
| 9,183,735 | B1 | 11/2015 | Pineau et al. |
| 9,282,537 | B2 * | 3/2016 | Gerrish .................. H04W 4/90 |
| 9,373,245 | B2 * | 6/2016 | Gerrish .................. H04R 27/00 |
| 9,385,878 | B1 | 7/2016 | Gerrish et al. |
| 9,406,205 | B2 * | 8/2016 | Keller ...................... G08B 5/38 |
| 10,242,553 | B2 * | 3/2019 | Nalukurthy ......... H04L 41/0866 |
| 10,540,886 | B2 | 1/2020 | Hamilton et al. |
| 10,621,527 | B2 | 4/2020 | Tiwari et al. |
| 10,679,491 | B1 * | 6/2020 | Nalukurthy ............ G08B 29/22 |
| 10,754,873 | B2 * | 8/2020 | Shao .................. G06F 16/2358 |
| 10,843,020 | B2 | 11/2020 | Goyette et al. |
| 11,055,983 | B2 | 7/2021 | Meruva et al. |
| 2012/0036208 | A1 | 2/2012 | Beisel |
| 2017/0230236 | A1 * | 8/2017 | Kim ......................... H04N 5/04 |
| 2019/0334983 | A1 * | 10/2019 | Largman ............. H04L 41/0668 |
| 2020/0413237 | A1 | 12/2020 | Stowell et al. |

OTHER PUBLICATIONS

British Examination Report for Application No. GB2214748.2, Issued Apr. 6, 2023, 3 Pages.

* cited by examiner

SYNCHRONIZING DATA BETWEEN FIRE PANELS AND THE MASS NOTIFICATION SYSTEM

CROSS-REFERENCE TO RELATED APPLICATIONS

This application claims the benefit of Provisional Application No. 63/254,627 filed Oct. 12, 2021, the disclosure of which is incorporated herein by reference in its entirety.

BACKGROUND

The present disclosure relates to control systems, and more specifically, to autoconfiguration and data synchronization between fire panels and mass notification systems (MNS).

Mass notification systems provide a platform to simultaneously communicate with a plurality of recipients. The mass notification system is a combination of software and hardware that provides a means of delivering messages to a set of recipients. For example, notification systems can send emails or text messages or make phone calls with automated messages. The complexity of the notification system is often dependent on the application. The use of notification systems can range from product/service advertisements to emergency applications.

BRIEF DESCRIPTION

According to one or more embodiments, a method and a system for synchronizing a mass notification system are provided. The embodiments include detecting an update in a configuration at a control panel over a first communication channel: generating, at the server, an update notification message based at least in part on the detection; and transmitting, at the server, the update notification message over a second communication channel to synchronize an MNS with the update in the configuration at the control panel.

In addition to one or more of the features described herein, or as an alternative, further embodiments include maintaining a current configuration of the control panel.

In addition to one or more of the features described herein, or as an alternative, further embodiments include receiving a control command for at least one of the control panel or a network device operably coupled to the control, and transmitting control command to the control panel.

In addition to one or more of the features described herein, or as an alternative, further embodiments include automatically triggering the generation of the update notification and transmission of the update notification over the second communication channel responsive to the detection.

In addition to one or more of the features described herein, or as an alternative, further embodiments include at least one of adding, removing, or updating a network device coupled to the control panel.

In addition to one or more of the features described herein, or as an alternative, further embodiments include performing the update in the configuration at the control panel using a third-party system communicating over a third communication channel.

In addition to one or more of the features described herein, or as an alternative, further embodiments include a fire control panel that is operably connected to one or more network devices, wherein the one or more network devices include at least one of a fire alarm, a smoke detector, or a temperature sensor.

In addition to one or more of the features described herein, or as an alternative, further embodiments include automatically detecting active fire panels.

In addition to one or more of the features described herein, or as an alternative, further embodiments include detecting an error in the configuration to synchronize the MNS: comparing the current configuration to the updated configuration; and transmitting an error message including the update configuration to the MNS.

In addition to one or more of the features described herein, or as an alternative, further embodiments include forwarding real-time data to the MNS.

Technical effects of embodiments of the present disclosure include increasing the effectiveness of the MNS and reducing the manual errors that may be introduced by a user during configuration. The technical effects and benefits of the present disclosure allow for the elimination of the external system files that must be updated at the MNS and the panels.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
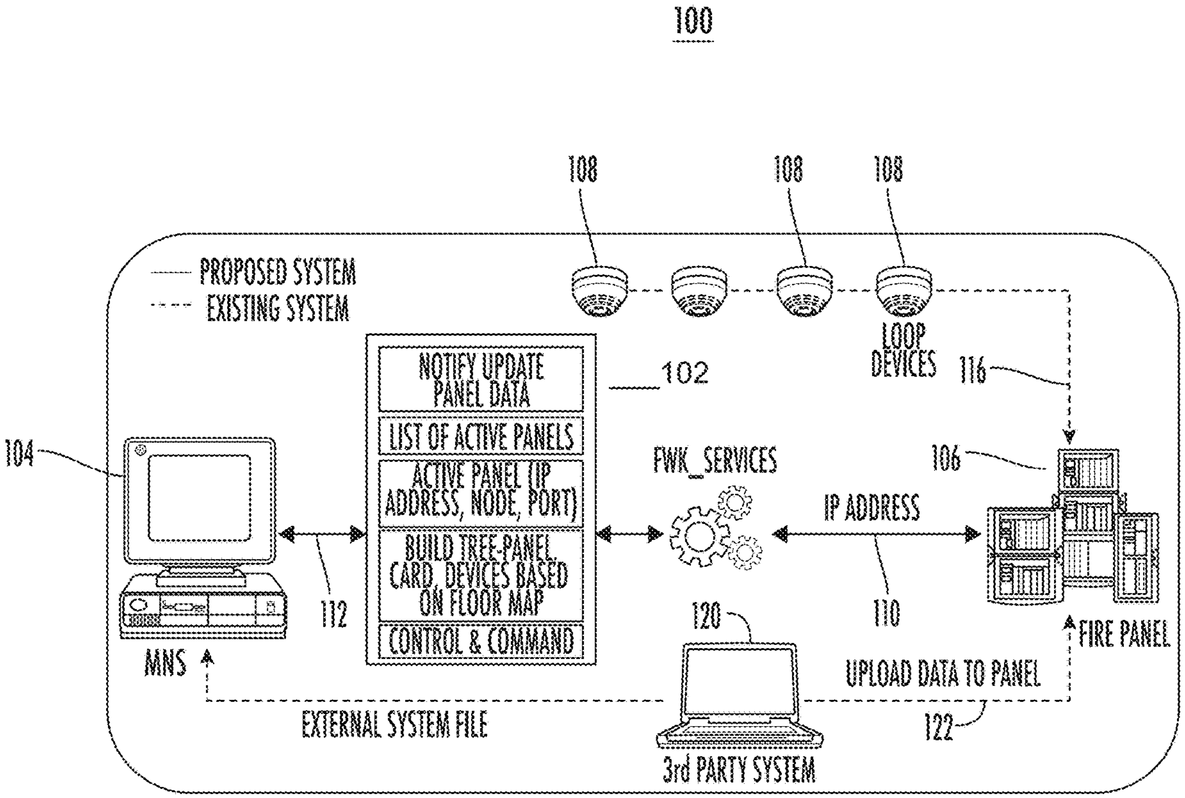
FIG. 1 depicts a system for automatic configuration of importing fire devices in accordance with one or more embodiments of the disclosure.

The configuration of systems and network devices of a mass notification system is largely a manual process that must be performed by an administrator or technician. An external third-party system, such as the third-party system 120 shown in FIG. 1, is used by an operator to configure the control panels over a communication channel 122. After the control panels are updated, the MNS must also be updated by the third-party system. Existing systems do not include a mechanism to synchronize the configuration data between the control panels and the MNS. Therefore, current systems are not configured to automatically detect changes in the configuration that have occurred.

Typical MNS configuration requires a series of tedious steps such as collecting information for the panels (IP address, port type and number, node enable, encryption, passphrase, ECP license, etc.) creating nodes, configuring the nodes, and importing external data Current technologies do not provide a mechanism for detecting whether imported projects in MNS and the control panel are synchronized. One or more technical aspects of the disclosure are directed to automatically maintaining synchronization between the fire panels and the mass notification system without user intervention.

The example embodiments discussed herein are directed to systems, apparatuses, and methods for synchronization of mass notification systems. FIG. 1 shows a diagram of a system 100 in accordance with one or more embodiments of the disclosure. The system 100 of FIG. 1 can include a server 102, an MNS 104, one or more control panels 106, one or more network devices 108.

The server 102 can include any type of computing devices that is capable of processing and interpreting the communications over the network devices. In one or more embodiments of the disclosure, the server 102 can communicate with the one or more control panels 106 over communication channel 110 and can communicate with the MNS 104 over communication channel 112.

The communication between the control panel 106 (e.g., fire control panel) and the server 102 over communication channel 110 can indicate a change that has been detected at the control panel 106. Each control panel 106 can be coupled to and control a plurality of network devices 108. The network devices 108 can include but are not limited to sensors and detectors that are used for detecting smoke, temperature, pressure, or other conditions. In a non-limiting example, the network devices 108 can be arranged on various floors of a multi-story building. Also, the network devices 108 can be operated to monitor and or control various zones of a floor of a multi-story building. The network devices 108 can communicate with a control panel over communication 116. It can be appreciated the control panels 106 can communicate with one or more other control panels 106 to exchange network information. The network devices 108 are configured to transmit condition information to the control panel 106, or alternatively, the control panels 106 can poll the status or condition information from the network devices 108.

In some embodiments, new network devices 108 can be added to the control panels 106 and/or removed from the control panels 106. Other changes can include updating the configuration of the network devices 108 including the functionality and attributes for each of the network devices 108. The control panel 106 stores the configuration of the plurality of network devices 108. The control panels 106 can also be configured for communication with other control panels 106.

The processing, by the server 102, of data from the control panel 106 can include obtaining network information for the network devices 108. The communication between the server 102 and the MNS 104 allows the MNS 104 to maintain synchronization of the network information and states of the control panels 106 and network devices 108. The network information can include but is not limited to IP address, port type and number, node enable, encryption, passphrase, ECP license, etc. In addition, the real-time status or conditions detected by the network devices 108 can be obtained by the server 102 and forwarded to the MNS 104. The server 102 is configured to push or transmit any detected updates at the control panels 106 to the MNS 104 for automatic configuration updates.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

In one or more embodiments of the disclosure, the server 102 is configured to automatically discover and identify the active panels (IP address, node, port), build trees, control and command from the MNS 104. In one or more embodiments of the disclosure, the server 102 is configured to compare a stored version of the configuration with a current version of the configuration. It can be appreciated that each version of the configuration can be associated with a time stamp indicating when the file was generated, and the latest time stamp can be used as the most up-to-date version of the configuration. The same technique can be used for determining an error by the server 102.

In one or more embodiments, the current list of control panels 106 can be maintained in the server 102 and can be compared to the updated list of control panels 106 to determine which control panels 106 are currently active. Based on the list of active control panels 106 nodes can be created as part of the configuration. Each node can be associated with the floor plan identifying the location of each node.

In one or more embodiments of the disclosure, an update that is detected at the control panels 106 can trigger the generation and transmission of an update notification message to the MNS 104. In other words, the configuration update is automatically pushed to the MNS 104. The update notification message can include but is not limited to the IP address of the device, the port, device type, etc. In addition, the server 102 is configured to maintain the floor plan information and network device 108 location information.

Figure 2:
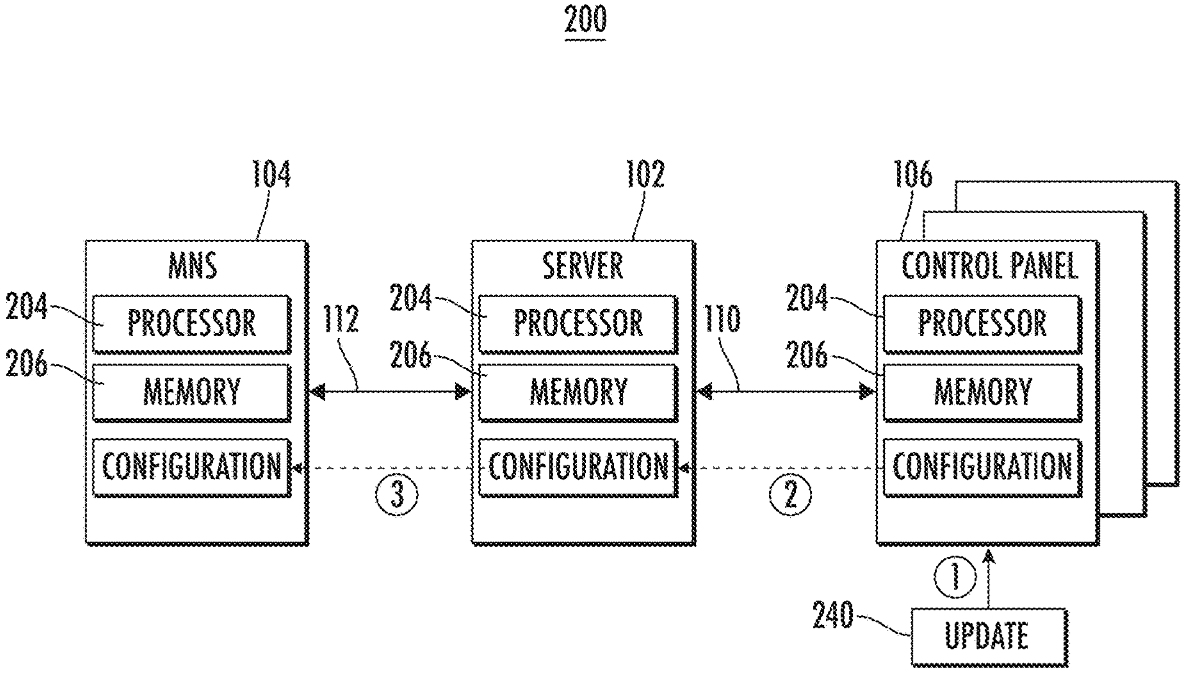
FIG. 2 depicts a generic processor for practicing the teaching described herein.
Figure 3:
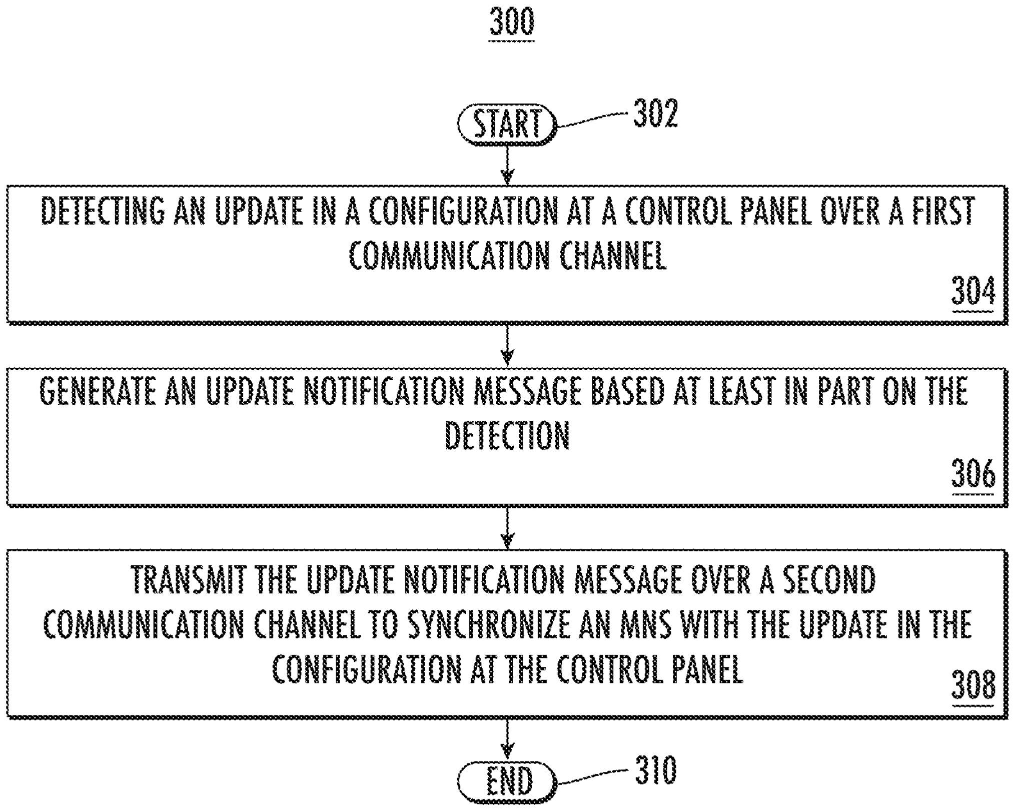
FIG. 3 depicts a method for automatically synchronizing data in accordance with one or more embodiments of the disclosure.

FIG. 2 illustrates an example block diagram of a system 200. As shown in FIG. 2, the server 102, the MNS 104, and each of the control panel(s) 106 include a memory, a processor, and further maintains a configuration of the system 200. The processors 204 and a memory 206 to carry out the operations for synchronizing the MNS 104 and the control panel 106. It can be appreciated the server 102, the MNS 104, and each of the control panel(s) 106 can include other components or modules and is not limited by the components shown in FIG. 2. In one or more embodiments of the disclosure, the processor 204 can include a processor 204 of a general-purpose computer, special purpose computer, or other programmable data processing apparatus configured to execute instruction via the processor of the computer or other programmable data processing apparatus. The memory 206 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), etc.). Each control panel 106 is configured to be operably connected to one or more network devices 108 using the appropriate interfaces. The network devices 108 can include fire alarms, smoke detectors, and temperature sensors, to name a few. In addition, the network devices 108 can include controllers, field panels, sensors, actuators, valves, power switches, cameras, lighting, etc.). It can be appreciated the network devices 108 can include one or more general-purpose data processors, programmable controllers, etc., and can be configured with instructions to perform the sensing and detection. As shown in FIG. 3, the configuration of the control panel 106 is updated at step 1. In step 2, the server 102 detects the update at the control panel 106 and forwards the updated configuration to the MNS 104.

FIG. 3 illustrates a flowchart of a method 300 for synchronizing the MNS 104 and control panel 106 in accordance with one or more embodiments of the disclosure. The method 300 may be performed, for example, in the server 102 of the system 100 or performed in a plurality of components such as that shown in FIG. 1. The server 102 is used to automatically maintain the synchronization of configuration between the MNS 104 and the control panels 106. The method 300 begins at block 302 and proceeds to block 304 which provides for detecting, at a server, an update in a configuration at a control panel over a first communication channel. Block 306 generates, at the server, an update notification message based at least in part on the detection. Block 308 transmits, at the server, the update notification message over a second communication channel to synchronize an MNS with the update in the configuration at the control panel. The method 300 ends at block 310. It can be appreciated the steps shown in FIG. 3 can include different steps or a different sequence of steps and is not intended to be limited by that shown in FIG. 3.

The technical effects and benefits include eliminating the need for an external file system to update both the control panel(s) 106 and the MNS 104. By including a server 102 to automatically detect any updates in the configuration of a control panel 106, the updated configuration data can be automatically pushed to the MNS 104. This feature can avoid any operator mistakes that may be introduced when manually updating the configuration information. This allows synchronization to be automated and more robust than existing techniques.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A computer-implemented method for synchronizing mass notification system (MNS), the computer-implemented method comprising:

detecting, at a server, an update in a configuration at a control panel over a first communication channel, wherein the update in the configuration at the control panel corresponds to (i) adding or removing a network device or (ii) updating functionality and attributes for the network device;

generating, at the server, an update notification message based at least in part on the detection; and transmitting, at the server, the update notification message over a second communication channel to synchronize the MNS with the update in the configuration at the control panel;

wherein the control panel is a fire control panel, the fire control panel is operably connected to one or more network devices, wherein the one or more network devices include at least one of a fire alarm, a smoke detector, or a temperature sensor.

2. The computer-implemented method of claim 1, further comprising maintaining a current configuration of the control panel.

3. The computer-implemented method of claim 2, further comprising receiving a control command for at least one of the control panel or a network device operably coupled to the control; and transmitting control command to the control panel.

4. The computer-implemented method of claim 1, wherein generating the update notification and transmitting the update notification over the second communication channel is automatically triggered responsive to the detection.

5. The computer-implemented method of claim 1, wherein the update in the configuration at the control panel is performed by a third-party system over a third communication channel.

6. The computer-implemented method of claim 1, further comprising automatically detecting active fire panels.

7. The computer-implemented method of claim 1, further comprising detecting an error in the configuration to synchronize the MNS;

comparing the current configuration to the updated configuration; and transmitting an error message including the update configuration to the MNS.

8. The computer-implemented method of claim 1, further comprising forwarding real-time data to the MNS.

9. The computer-implemented method of claim 1, wherein the update in the configuration at the control panel corresponds to adding or removing the network device.

10. A system for synchronizing a mass notification system (MNS) and the comprising:

a control panel that is operably connected to a plurality of network devices and configured to store a configuration of the control panel and the plurality of network devices;

a mass notification system configured to store a configuration of at least one of the control panel and the plurality of network devices;

a server configured to:

detect an update in a configuration at a control panel over a first communication channel, wherein the update in the configuration at the control panel corresponds to (i) adding or removing a network device or (ii) updating functionality and attributes for the network device;

generate an update notification message based at least in part on the detection; and transmit the update notification message over a second communication channel to synchronize an MNS with the update in the configuration at the control panel;

wherein the control panel is a fire control panel, the fire control panel is operably connected to one or more network devices, wherein the one or more network devices include at least one of a fire alarm, a smoke detector, or a temperature sensor.

11. The system of claim 10, wherein the server is configured to maintain a current configuration of the control panel.

12. The system of claim 11, wherein the server is configured to receive a control command for at least one of the control panel or a network device operably coupled to the control; and transmit control command to the control panel.

13. The system of claim 10, wherein generating the update notification and transmitting the update notification over the second communication channel is automatically triggered responsive to the detection.

14. The system of claim 10, wherein the update in the configuration at the control panel is performed by a third-party system over a third communication channel.

15. The system of claim 10, wherein the server is configured to automatically detect active fire panels.

16. The system of claim 10, wherein the server is configured to detect an error in the configuration to synchronize the MNS;

compare the current configuration to the updated configuration; and transmit an error message including the update configuration to the MNS.

17. The system of claim 10, wherein the server is configured to forward real-time data to the MNS.

18. The system of claim 10, wherein the update in the configuration at the control panel corresponds to adding or removing the network device.

* * * * *